United States Patent
Bergmann

(10) Patent No.: US 12,325,472 B2
(45) Date of Patent: Jun. 10, 2025

(54) STEER-BY-WIRE STEERING APPARATUS AND METHOD FOR OPERATING A STEER-BY-WIRE STEERING APPARATUS

(71) Applicant: ZF Automotive Germany GmbH, Alfdorf (DE)

(72) Inventor: Philipp Bergmann, Duesseldorf (DE)

(73) Assignee: ZF Automotive Germany GmbH, Alfdorf (DE)

( * ) Notice: Subject to any disclaimer, the term of this patent is extended or adjusted under 35 U.S.C. 154(b) by 721 days.

(21) Appl. No.: 17/577,532

(22) Filed: Jan. 18, 2022

(65) Prior Publication Data

US 2022/0227413 A1    Jul. 21, 2022

(30) Foreign Application Priority Data

Jan. 19, 2021    (DE) .......................... 102021200442.3

(51) Int. Cl.
*B62D 5/00* (2006.01)
*B62D 6/00* (2006.01)
*H02K 49/04* (2006.01)

(52) U.S. Cl.
CPC ............. *B62D 5/006* (2013.01); *B62D 6/008* (2013.01); *H02K 49/043* (2013.01)

(58) Field of Classification Search
CPC ........ B62D 5/006; B62D 5/005; B62D 6/008; H02K 49/043
See application file for complete search history.

(56) References Cited

U.S. PATENT DOCUMENTS

| 5,803,202 | A | * | 9/1998 | Bohner | B62D 5/005 180/443 |
| 6,283,859 | B1 | * | 9/2001 | Carlson | G06F 3/016 463/36 |
| 6,712,174 | B1 | * | 3/2004 | Bohner | F16F 1/16 180/402 |
| 6,814,177 | B2 | * | 11/2004 | Bohner | B62D 5/006 180/402 |

(Continued)

FOREIGN PATENT DOCUMENTS

| DE | 10329292 A1 | 1/2005 |
| DE | 10326119 B3 | 2/2005 |

(Continued)

*Primary Examiner* — Anne Marie M Boehler
*Assistant Examiner* — Michael R Stabley
(74) *Attorney, Agent, or Firm* — Kristin L. Murphy

(57) ABSTRACT

The disclosure relates to a steering wheel actuator unit for a steer-by-wire steering apparatus for a motor vehicle and having a steering axle, wherein a free end of the steering axle is designed for arranging a steering wheel and the steering axle is rotatably mounted about its longitudinal axle, the steering wheel actuator unit comprising at least one feedback device which acts on the steering axle to realize a predetermined torque and/or a predetermined damping, and a spindle device connected to the steering axle for providing end stops for the rotational movement of the steering axle. In order to be able to reduce and/or avoid incorrect operation in case of failure of the feedback device, the steering wheel actuator unit further comprising an eddy current device which generates a resistance for the rotation of the steering axle about its longitudinal axle.

17 Claims, 4 Drawing Sheets

(56) References Cited

U.S. PATENT DOCUMENTS

| | | | |
|---|---|---|---|
| 6,910,699 B2* | 6/2005 | Cherney | B62D 12/00 188/267.2 |
| 10,773,745 B2* | 9/2020 | Wilske | B62D 5/0403 |
| 11,685,424 B2* | 6/2023 | Kopiniok | H02K 49/04 180/400 |
| 2001/0052893 A1* | 12/2001 | Jolly | G06F 3/0338 345/156 |
| 2004/0238300 A1* | 12/2004 | Cherney | B62D 5/005 188/267 |
| 2020/0148248 A1* | 5/2020 | Wilske | B62D 5/006 |
| 2020/0307676 A1* | 10/2020 | Kopiniok | B62D 6/008 |
| 2022/0063707 A1* | 3/2022 | Markfort | G01L 5/221 |

FOREIGN PATENT DOCUMENTS

| | | |
|---|---|---|
| DE | 102019210386 A1 | 1/2020 |
| DE | 102020202582 A1 | 10/2020 |

* cited by examiner

STEER-BY-WIRE STEERING APPARATUS AND METHOD FOR OPERATING A STEER-BY-WIRE STEERING APPARATUS

CROSS-REFERENCE TO RELATED APPLICATION

This application claims priority to German Patent Application No. 102021200442.3, filed Jan. 19, 2021, the disclosure of which is incorporated herein by reference in its entirety.

TECHNICAL FIELD

The disclosure relates to a steering wheel actuator unit for a steer-by-wire steering apparatus for a motor vehicle having a steering axle, wherein a free end of the steering axle is designed for arranging a steering wheel and the steering axle is rotatably mounted about its longitudinal axle, the steering wheel actuator unit comprising at least one feedback device, which acts on the steering axle to realize a predetermined torque and/or a predetermined damping, and a spindle device connected to the steering axle for providing end stops for the rotational movement of the steering axle. The disclosure also relates to a steer-by-wire steering apparatus having such a steering wheel actuator unit and to a method for operating such a steering wheel actuator unit and/or for operating such a steer-by-wire steering apparatus.

BACKGROUND

Steering wheel actuator units are known. An example of a known steering wheel actuator unit or steer-by-wire steering apparatus is described in DE 10 2019 210 386 A1.

In the case of an inactive feedback device, in particular in case of a defect or failure of the feedback device, the steering axle can usually be turned or rotated very easily by the steering wheel due to only very low frictional forces and/or masses. This creates the risk that undesirably strong steering movements are generated. There can be an increased risk of a loss of control of the motor vehicle being steered by a corresponding steer-by-wire steering apparatus.

SUMMARY

What is needed is to further develop a steering wheel actuator unit, a steer-by-wire steering apparatus, and/or a method of the type mentioned at the out-set in such a way that operating errors can be reduced and/or avoided in case of failure of the feedback device.

A steering wheel actuator unit is disclosed, as well as a steer-by-wire steering apparatus and a method. Exemplary arrangements of the disclosure can be found in the independent and dependent claims and in the following description.

In one exemplary arrangement, the steering wheel actuator unit is designed for a steer-by-wire steering apparatus for a motor vehicle. In contrast to the case of a steering apparatus that is conventional, a steering wheel is connected via a mechanical connection to at least the wheels of a front axle of the motor vehicle. This mechanical connection can provide the driver with feedback on what is happening at the interface between the wheels and a road surface, thereby helping him to drive the vehicle. In the case of a steer-by-wire steering apparatus, however, there is no direct mechanical connection between the wheels and the steering wheel. An artificial steering feel or an artificial feedback must therefore be applied to the steering wheel in order to give the driver feedback on what is happening at the interface between the wheels and the road surface. The steering wheel actuator unit is designed in a suita-ble manner for this purpose. In particular, a predetermined torque and/or a predetermined damping act(s) on a steering axle by a feedback device.

The steering wheel actuator unit accordingly has a steering axle. In this case, a free end of the steering axle is designed for arranging a steering wheel. The term "steering wheel" is to be understood in the context of the present application in such a way that it encompasses any shape of a handle for steering the motor vehicle, which handle can be grasped by a driver. The steering wheel can thus be designed in the shape of a wheel or have handles. In the case of a design with handles, the steering wheel can, for example, have a W, M, or U-shaped design. At its free end, the steering axle can have a hub on which the steering wheel is mounted. The steering axle is rotatably mounted about its longitudinal axle. The rotation of the steering axle can be brought about by the steering wheel.

Furthermore, the steering wheel actuator unit has at least one feedback device. The feedback device acts on the steering axle in order to realize a predetermined torque and/or a predetermined damping. In particular, the predetermined torque and/or the predetermined damping is predetermined by a control unit. Thus, artificial feedback or an artificial steering feel can be provided to a driver by the feedback device.

Furthermore, the steering wheel actuator unit has a spindle device connected to the steering axle for providing end stops for the rotational movement of the steering axle or for stopping a rotational movement of the steering axle. As a result, the steering movement and/or a steering angle can be limited for a driver with regard to the actuation of the steering wheel and the steering axle connected thereto. In particular, the spindle device provides a first end stop and a second end stop.

According to the disclosure, the steering wheel actuator unit has an eddy current device which generates a resistance for the rotation of the steering axle about its longitudinal axle.

The advantage in this case is that a resistance continues to act on the steering axle by the eddy current device, even in case of failure of the at least one feedback device. This can considerably reduce the risk of undesirably strong steering movements. As a result, the risk of a loss of control over the motor vehicle in case of failure of the at least one feedback device can be reduced.

According to a further exemplary arrangement, the eddy current device is designed to generate a resistance that is dependent on a rotational speed of the steering axle. The resistance acting on the rotation of the steering axle, which is generated by the eddy current device, is therefore dependent on the rotational speed of the steering axle about its longitudinal axle, in particular on the speed of the steering movement of the steering wheel. In one exemplary arrangement, a resistance generated by the eddy current device and acting on the rotation of the steering axle increases as the rotational speed of the steering axle increases. This favors the avoid-ance of undesirable strong steering movements. In one exemplary arrangement, the eddy current device is designed to generate a torque and/or a damping on the steering axle and in case of a rotation of the steering axle about its longitudinal axle. The eddy current device acts on the steering axle with a resistance only when it rotates. The effect of the eddy current device therefore only starts in when stating the rotation of the steering axle. In a stationary state of the steering axle, the eddy current device cannot have any effect on the steering axle. In one exemplary arrangement, the eddy current device is designed as an eddy current brake. In particular, the eddy current device is based on Lenz's rule.

According to a further exemplary arrangement, the spindle device has the eddy current device or the eddy current device is assigned to the spindle device. In one particular arrangement, the spindle device has a spindle connected to the steering axle for common rotation. In particular, the steering axle and the spindle are non-rotatably connected to one another. The longitudinal axle of the steering axle can coincide with a longitudinal axle of the spindle. The spindle device also has a spindle nut. The spindle nut is arranged non-rotatably on the spindle and is linearly displaceable in the direction of a longitudinal axle of the spindle. In one particular arrangement, the spindle has an external thread which interacts with a correspondingly designed internal thread of the spindle nut. In the case of a rotation of the steering axle, the spindle rotates at the same time. As a result, the spindle nut is displaced linearly in the direction of the longitudinal axle of the spindle. This linear displacement of the spindle nut is limited by the end stops of the spindle device. If the spindle nut hits one of the end stops, continuation of the rotation of the steering axle in the direction of rotation that led to the blockage is blocked. Thus only a rotation of the steering axle in an opposite direction of rotation is possible, whereby the spindle nut moves away from the first end stop in the direction of the second end stop.

In one exemplary arrangement, the eddy current device provides a redundancy function in case of failure of the feedback device. In one particular arrangement, a redundant feedback device can be dispensed with because of the eddy current device. The steering wheel actuator unit therefore does not have to have two feedback devices that are independent of one another; instead, a single feedback device is sufficient, the eddy current device fulfilling the redundancy function. More spe-cifically, the eddy current device is designed to be independent and/or autonomous in relation to the feedback device. The eddy current device can act on the steering axle simultaneously or together with the at least one feedback device. In one exemplary arrangement, however, the eddy current device can be switched on and/or off as required. In particular, the eddy current device is only activated or switched on in case of failure of the at least one feedback device.

According to a further exemplary arrangement, the spindle nut has at least one magnet or a plurality of magnets. The magnet or the plurality of magnets can be designed as permanent magnets. In one exemplary arrangement, the spindle nut has the at least one magnet or the plurality of magnets for forming the eddy current device. The at least one magnet or the plurality of magnets can be arranged in the region of an outer circumference of the spindle nut. In one exemplary arrangement, a plurality of magnets are arranged in a ring-like or ring-shaped manner with respect to one another in the region of the outer circumference on the spindle nut. Two poles of the at least one magnet or of the plurality of magnets can be aligned with one another in the direction of the longitudinal axle of the spindle. In one particular arrangement, a single magnet has a north pole and a south pole. The north pole can face a first end stop of the spindle device and the south pole can face a second end stop of the spindle device facing away from the first end stop. In the case of a plurality of magnets, the north pole faces the first end stop of the spindle device and the south pole faces the second end stop of the spindle device, so that the plurality of magnets are aligned in the same way. Due to the arrangement of the magnet or the plurality of magnets on the spindle nut, the magnet or the plurality of magnets move together with the spindle nut during the rotation of the spindle in the longitudinal direction of the spindle.

According to a further exemplary arrangement, the eddy current device has an electrical conducting unit. In particular, the electrically conducting unit is formed from an electrically conductive material. The electrical conducting unit surrounds at least one portion of the spindle device. Eddy currents can be generated in the electrical conducting unit. In one exemplary arrangement, the electrical conducting unit interacts with the magnet or the plurality of magnets of the spindle nut in order to form the eddy currents. In particular, the spindle and the spindle nut are arranged within the electrical conducting unit. In one exemplary arrangement, the electrical conducting unit extends over the entire length of the spindle. In one exemplary arrangement, the electrical conducting unit extends over the length of a portion of the spindle, this portion of the spindle having the external thread for cooperation with the internal thread of the spindle nut. In case of a linear movement of the spindle nut in the longitudinal direction of the spindle, eddy currents can be generated or induced by the magnet or the plurality of magnets of the spindle nut in the electrical conducting unit. In one particular arrangement, these eddy currents in turn generate their own magnetic field, which, however, is oriented in the opposite direction to the magnetic field generated by the spindle nut. This results in the resistance generated by the eddy current device, which acts on and/or against the rotation of the handlebar axle.

The electrical conducting unit can be designed as an electrically conductive tube. In one exemplary arrangement, the electrically conductive tube is a copper tube. The spindle device can be arranged within the electrically conductive tube. In one exemplary arrangement, the tube is designed to be slotted in the longitudinal direction. Thus, the tube can have a slot extending in the longitudinal direction of the tube. In this case, the slot of the tube is open in a switched-off or inactive state of the eddy current device. As a result, no adequate eddy currents can develop in the electrical conducting unit even during the movement of the spindle nut with the magnet or the multiple magnets. Thus, in the inactive or switched-off state of the eddy current device, no or at most negligibly low resistance acts on the rotation of the steering axle. In a switched-on or active state of the eddy current device, the slot of the tube is closed. In other words, in the switched-on or active state of the eddy current device, a closed ring-shaped cross section results for the electrically conductive tube. As a result, sufficiently strong eddy currents can develop in the electrical conducting unit, which cause the desired resistance to the rotation of the steering axle during the movement of the spindle nut with one or more magnets. For this purpose, a magnetic field generated by the eddy currents counteracts the magnetic field of the magnetic field of the spindle nut generated by the magnet or the multiple magnets.

According to an alternative arrangement, the electrical conducting unit can be designed as a coil. In particular, the coil is part of a circuit for short-circuiting the coil. A switch can be arranged in the circuit, the switch being open when the eddy current device is in a switched-off or inactive state. As a result, in the switched-off or inactive state of the eddy current device, no adequate eddy currents are generated in the coil when the spindle nut with the magnet or the plurality of magnets moves in the longitudinal direction of the spindle. In a switched-on or active state of the eddy current device, the switch is closed. As a result, sufficient eddy currents are generated in the coil to generate the desired resistance to the rotation of the steering axle when the spindle nut with the magnet or a plurality of magnets moves in the longitudinal direction of the spindle.

A steer-by-wire steering apparatus having a steering wheel actuator unit according to the disclosure is particularly advantageous. In this case, the steer-by-wire steering apparatus has a front axle actuator unit which is assigned to a front axle of a motor vehicle and is designed to steer wheels of the front axle. Furthermore, the steer-by-wire steering apparatus has a control unit, wherein the control unit is connected to the steering wheel actuator unit and to the front axle actuator unit for transmitting electrical signals. In particular, the eddy current device provides a redundancy function in the event of failure of the feedback device of the steering wheel actuator unit. This arrangement increases driving safety in case of failure of the feedback device.

Furthermore, a method for operating a steering wheel actuator unit according to the disclosure and/or for operating a steer-by-wire steering apparatus according to the disclosure for a motor vehicle is advantageous, wherein a resistance for the rotation of the steering axle about its longitudinal axle is generated by the eddy current device.

In particular, the steering wheel actuator unit and/or steer-by-wire steering apparatus operated according to the method according to the disclosure is a steering wheel actuator unit and/or steer-by-wire steering apparatus described above. The method is preferably developed in accordance with the configurations explained in connection with the steering wheel actuator unit and/or the steer-by-wire steering apparatus. Furthermore, the steering wheel actuator unit and/or steer-by-wire steering apparatus described in this case can be developed in accordance with the configura-tion explained in connection with the method.

BRIEF DESCRIPTION OF DRAWINGS

The disclosure is explained in more detail below with reference to the drawings. In this case, like reference signs relate to the like, similar, or functionally identical components or elements. In the drawings.

DETAILED DESCRIPTION

Figure 1:
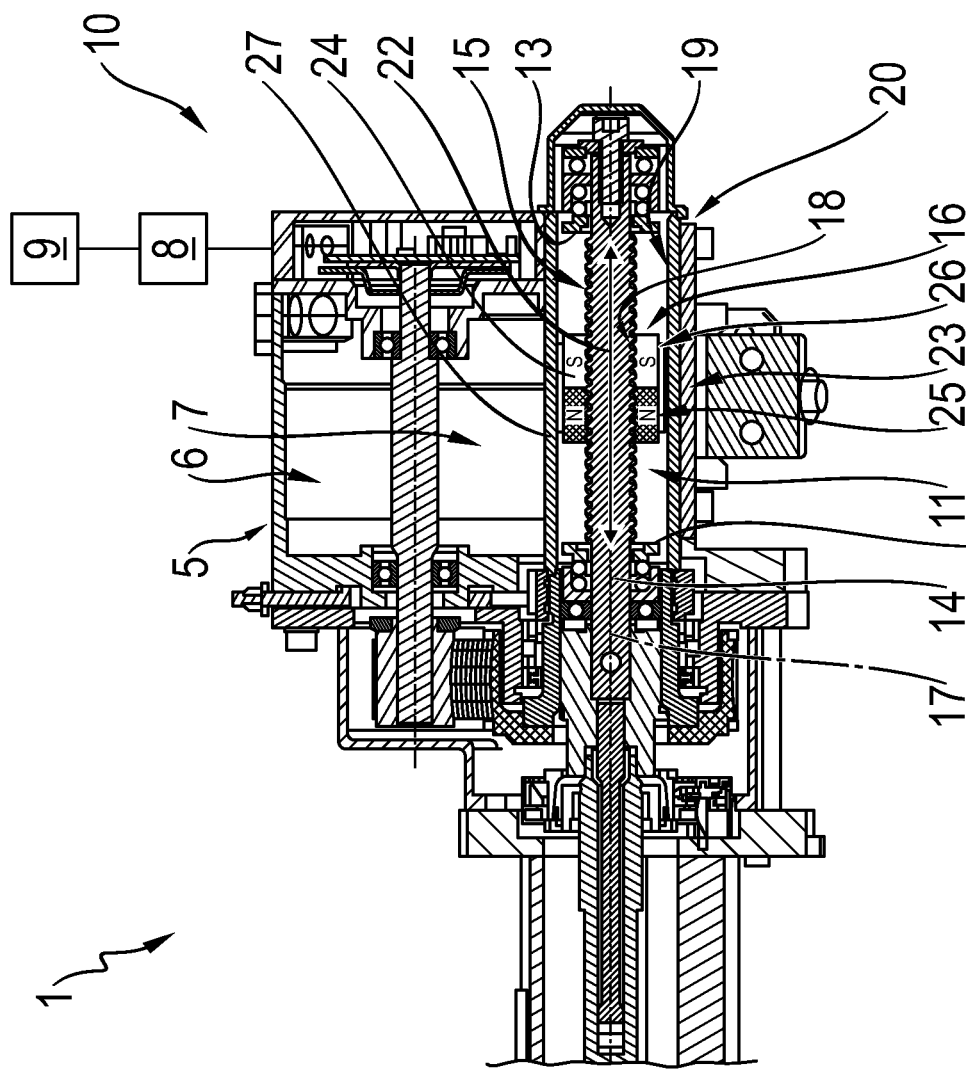
FIG. 1 is a sectional plan view of a steering wheel actuator unit according to an exemplary arrangement of the disclosure.
Figure 1:
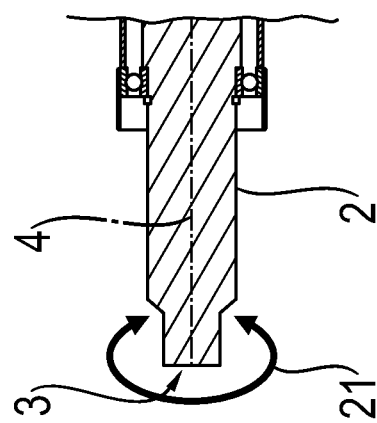

FIG. 1 shows a sectional plan view of a steering wheel actuator unit 1 according to the disclosure. The steering wheel actuator unit 1 is part of a steer-by-wire steering apparatus 10. The steering wheel actuator unit 1 has a steering axle 2. The steering axle 2 has a free end 3. The free end 3 of the steering axle 2 is designed for arranging a steering wheel (not shown in detail in this case). The steering axle 2 is mounted rotatably about its longitudinal axle 4, in one particular arrangement by the steering wheel. The steering wheel actuator unit 1 also has a feedback device 5.

The feedback device 5 acts on the steering axle 2 in order to realize a predetermined torque and/or a predetermined damping. In this exemplary arrangement, the feedback device 5 has a schematically indicated first feedback actuator 6 and a schematically indicated second feedback actuator 7. Because of the two feedback actuators 6, 7, the feedback device 5 is designed to be redundant at the same time.

The torque or damping acting on the rotation of the steering axle 2 by the feedback device 5 is predetermined or controlled by a control unit 8, which is only indicated schematically in this case. The control unit 8 is also connected to a front axle actuator unit 9, which is only indicated schematically in this case. The front axle actuator unit 9 is assigned to a front axle (not shown in more detail in this case) of a motor vehicle and is designed to steer wheels (not shown in more detail in this case) of the front axle. By operation of the control unit 8, electrical signals are exchanged between the steering wheel actuator unit 1 and the front axle actuator unit 9. The steering wheel actuator unit 1, the control unit 8 and the front axle actuator unit 9 are components of the steer-by-wire steering apparatus 10.

The steering wheel actuator unit 1 has a spindle device 11. The spindle device 11 is connected to the steering axle 2. In this case, the spindle device 11 provides a first end stop 12 and a second end stop 13 for stopping a rotational movement of the steering axle 2. The spindle device 11 has a spindle 14. The spindle 14 has an external thread 15. The spindle 14 is connected to the steering axle 2 for common rotation. Furthermore, the spindle device 11 has a spindle nut 16. The spindle nut 16 is arranged non-rotatably on the spindle 14 and is linearly displaceable in the direction of a longitudinal axle 17 of the spindle 14. In this case, the longitudinal axle 17 of the spindle 14 and the longitudinal axle 4 of the steering axle 2 coincide. The spindle nut 16 has an internal thread 18 which is designed to correspond in shape to the external thread 15 of the spindle 14 and which engages in a form-fitting manner. To implement the non-rotatable arrangement of the spindle nut 16 on the spindle 14, the spindle nut 16 is guided in this exemplary arrangement in a guide 19 of a housing 20 in the longitudinal direction to the longitudinal axle 17. In this case, the spindle device 11 is arranged within the housing 20.

In the case of a rotation of the steering axle 2, for example due to actuation of a steering wheel, about the longitudinal axle 4 according to the double arrow 21 in a first direction of rotation or in a second direction of rotation facing away from the first direction of rotation, the spindle 14 connected to the steering axle 2 is also brought into a corresponding rotation about the longitudinal axle 17. As a result, the spindle nut 16 is brought into a linear movement according to the double arrow 22 in the direction of the first end stop 12 or in the direction of the second end stop 13.

The steering wheel actuator unit 1 also has an eddy current device 23. In this case, the eddy current device 23 is designed as an eddy current brake for the spindle 14. Due to the eddy current device 23, a resistance for or to the rotation of the steering axle 2 about its longitudinal axle 4 can be generated. The eddy current device 23 is assigned to the spindle device 11. To form the eddy current device 23, the spindle nut 16 has a plurality of magnets 24 in this exemplary arrangement. For the sake of clarity, not all magnets 24 are provided with a reference number. The plurality of magnets 24 are arranged on the spindle nut 16 in the region of an outer circumference of the spindle nut. In the case of a linear movement of the spindle nut 16 in the longitudinal direction of the longitudinal axle 17, the magnets 24 also move with it. The magnets 24 are designed as permanent magnets and have two poles 25, 26. In this exemplary arrangement, the first pole 25 is designed as a north pole and the second pole 26 is designed as a south pole. Furthermore, the two poles 25, 26 of the plurality of magnets 24 are each aligned in the direction of the longitudinal axle 17 of the spindle 14. As a result, in this exemplary arrangement, the pole 25 faces the first end stop 12 and the pole 26 faces the second end stop 13. In an alternative exemplary arrangement, the first pole 25 of the magnets 24 can face the second end stop 13 and the second pole 26 can face the first end stop 12.

Furthermore, the steering wheel actuator unit 1 has an electrical conducting unit 27 for forming the eddy current device 23. In this exemplary arrangement, the electrical conducting unit 27 surrounds a portion of the spindle device 11 which corre-sponds to the portion of the spindle 14 with the external thread 15. In this case, the spindle 14 and the spindle nut 16 are arranged within the electrical conducting unit 27. In this exemplary arrangement, the electrical conducting unit 27 is designed as an electrically conductive tube. In this case, the tube is implemented as a copper tube, for example. Furthermore, in this exemplary arrangement, the electrical conducting unit 27 is assigned to the housing 20.

Eddy currents can be generated in the electrical conducting unit 27 during a movement of the spindle nut 16 by the magnets 24. These eddy currents in turn generate a further autonomous magnetic field which is directed in the opposite direction to the magnetic field of the magnets 24. As a result, a resistance acting on the rotation of the spindle 14 and thus on the steering axle 2 is generated. This results in a resistance that is dependent on the rotational speed of the steering axle 2 or of the spindle 14. Thus, the resistance generated by the eddy current device 23 increases with increasing rotational speed of the steering axle 2 or the spindle 14. By the eddy current device 23, a torque counteracting the rotation of the steering axle 2 and/or counteracting damping acts on the spindle 14 and via this on the steering axle 2.

In case of failure of the feedback device 5, the eddy current device 23 provides a redundancy function. In this case, the eddy current device 23 can be configured to be switched on and/or off.

Figure 2:
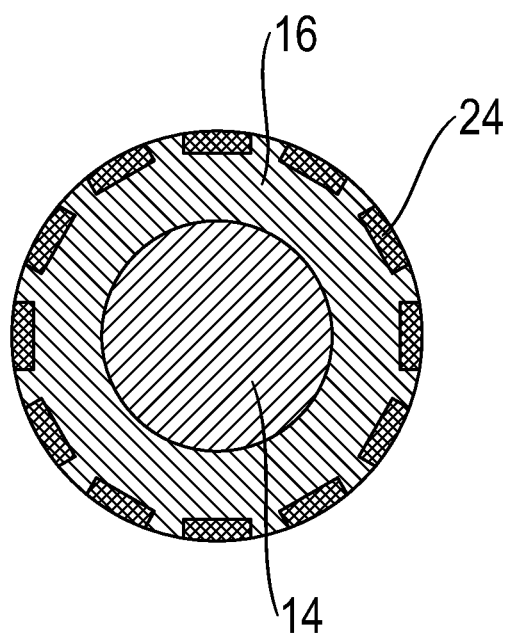
FIG. 2 is a cross section of a spindle nut on a spindle for a steering wheel actuator unit according to the disclosure in accordance with FIG. 1, FIG. 3a, 3b are schematic representations of an electrical conducting unit for a steering wheel actuator unit according to the disclosure in accordance with FIG. 1.

FIG. 2 shows a cross section of a spindle nut 16 on a spindle 14 for the steering wheel actuator unit 1 according to the disclosure in accordance with FIG. 1. The plurality of magnets 24 can be clearly seen, which are arranged or fastened to one another in a ring shape in the region of the outer circumference of the spindle nut 16 on the spindle nut 16. In one exemplary arrangement, the multiple magnets 24 are arranged at a uniform distance from one another on the outer circumference of the spindle nut 16.

Figure 3A:
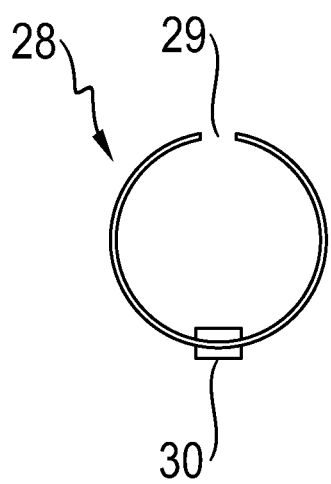
Figure 3B:
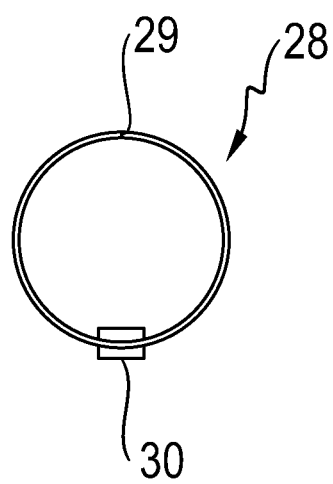

FIGS. 3a and 3b are schematic representations of an electrical conducting unit 28 as an alternative for the electrical conducting unit 27 for use in a steering wheel actuator unit 1 in accordance with FIG. 1. In this exemplary arrangement, the electrical conducting unit 28 is designed as an electrically conductive tube, this tube being designed to be slotted in the longitudinal direction and thus having a slot 29 in accordance with FIG. 3a.

In this case, FIG. 3a shows the electrical conducting unit 28 in a switched-off or inactive state of an associated eddy current device 23 in the sense of FIG. 1. In this switched-off or inactive state, the slot 29 is open. As a result, during a movement of the spindle nut 16 with the magnets 24 in the longitudinal direction of the spindle 14 in accordance with FIG. 1, no eddy currents, or only weak eddy currents, are generated in the electrical conducting unit 28. As a result, the eddy current device 23 causes no or a negligibly low resistance to the rotation of the spindle 14 and thus the steering axle 2.

FIG. 3b shows the electrical conducting unit 28 with a closed slot 29. In contrast to FIG. 3a, this results in a closed ring-shaped cross section of the electrical conducting unit 28. When the slot 29 is closed in accordance with FIG. 3b, the eddy current device 23 is in a switched-on or active state according to FIG. 1.

The opening and/or closing of the slot 29 can be brought about by an actuating device 30 which is only indicated schematically in this case. In particular, the actuating device 30 is designed in such a way that it closes the slot 29 in case of failure of the feedback device 5 in accordance with FIG. 1.

Figure 4:
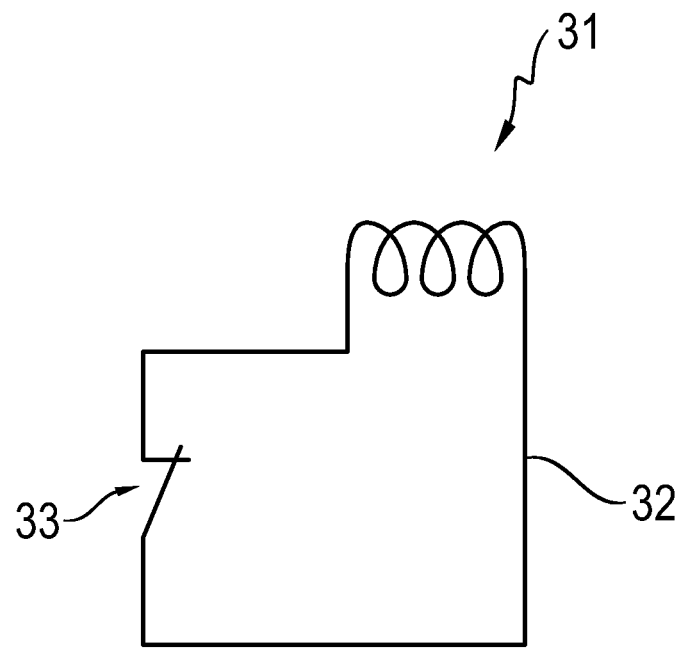
FIG. 4 is a schematic circuit of a further electrical conducting unit for a further steering wheel actuator unit according to the disclosure.

FIG. 4 shows a schematic circuit of a further electrical conducting unit 31 as an alternative for the electrical conducting unit 27 or 28 and for a further steering wheel actuator unit according to the disclosure. In this exemplary arrangement, the electrical conductor unit 31 is designed as a coil. This electrical conducting unit 31, designed as a coil, is part of a circuit 32 for short-circuiting the coil. Furthermore, in this exemplary arrangement, a switch 33 is arranged in the circuit 32. In this case, the switch 33 is shown closed. When the switch 33 is closed, a correspondingly designed eddy current device is in a switched-on or active state. When the switch 33 is open, the corresponding eddy current device is in a switched-off or inactive state.

In case of a steering wheel actuator unit 1 in accordance with FIG. 1, the coil 31 can be provided instead of the electrical conducting unit 27 designed as a tube.

The invention claimed is:

1. A steering wheel actuator unit for a steer-by-wire steering apparatus for a motor vehicle and having a steering axle, wherein a free end of the steering axle is designed for arranging a steering wheel and the steering axle is rotatably mounted about its longitudinal axle, the steering wheel actuator unit comprising at least one feedback device which acts on the steering axle to realize a predetermined torque and/or a predetermined damping, and a spindle device connected to the steering axle for providing end stops for the rotational movement of the steering axle, wherein the spindle device has an eddy current device that generates a resistance for the rotational movement of the steering axle about its longitudinal axle.

2. The steering wheel actuator unit according to claim 1, wherein the eddy current device is designed to generate a resistance that is dependent on a rotational speed of the steering axle wherein the eddy current device is designed to generate a torque and/or a damping on the steering axle and in case of a rotational movement of the steering axle about its longitudinal axle.

3. The steering wheel actuator unit according to claim 2, wherein the resistance generated by the eddy current device increases with increasing rotational speed of the steering axle.

4. The steering wheel actuator unit according to claim 1, wherein the eddy current device provides a redundancy function in case of failure of the feedback device.

5. The steering wheel actuator unit according to claim 1, wherein the spindle nut has at least one magnet, and wherein the at least one magnet is arranged in a region of an outer circumference of a spindle nut of the spindle device.

6. The steering wheel actuator unit according to claim 5, wherein two poles of the at least one magnet are aligned with one another in the direction of the longitudinal axle of the spindle.

7. The steering wheel actuator unit according to claim 1, wherein the spindle device has a spindle connected to the steering axle for common rotation and a spindle nut arranged non-rotatably on the spindle and linearly displaceable in the direction of a longitudinal axle of the spindle.

8. The steering wheel actuator unit according to claim 7, wherein the eddy current device has an electrical conducting unit, the electrical conducting unit surrounding at least one portion of the spindle device and configured for it being possible to generating eddy currents in the electrical conducting unit, wherein the spindle and the spindle nut being arranged within the electrical conducting unit.

9. The steering wheel actuator unit according to claim 8, wherein the electrical conducting unit is designed as an electrically conductive tube, wherein the tube is designed to be slotted in the longitudinal direction, a slot of the tube being open in a switched-off or inactive state of the eddy current device and being closed in a switched-on or active state of the eddy current device.

10. The steering wheel actuator unit according to claim 8, wherein the electrical conducting unit is designed as a coil, wherein the coil is part of a circuit for short-circuiting the coil.

11. The steering wheel actuator unit according to claim 10, wherein a switch is arranged in the circuit, the switch being open in a switched-off or inactive state of the eddy current device and being closed in a switched-on or active state of the eddy current device.

12. The steering wheel actuator unit according to claim 7, wherein the spindle nut is guided in a guide of a housing.

13. The steering wheel actuator unit according to claim 7, wherein the spindle nut has a plurality of magnets and wherein the plurality of magnets is arranged in a region of an outer circumference of the spindle nut of the spindle device, two poles of the plurality of magnets are aligned with one another in the direction of the longitudinal axle of the spindle.

14. The steering wheel actuator unit according to claim 13, wherein the plurality of magnets are fastened to one another in a ring shape about the spindle nut.

15. The steering wheel actuator unit according to claim 14, wherein each magnet of the plurality of magnets are arranged at a uniform distance from one another on the outer circumference of the spindle nut.

16. A steer-by-wire steering apparatus comprising a steering wheel actuator unit according to claim 1, and a front axle actuator unit, which is assigned to a front axle of a motor vehicle and is designed to steer wheels of the front axle, and a control unit, wherein the control unit is connected to the steering wheel actuator unit and the front axle actuator unit for transmitting electrical signals.

17. A method for operating a steering wheel actuator unit according to claim 1, wherein a resistance for the rotation of the steering axle about its longitudinal axle is generated by the eddy current device.

* * * * *